(No Model.)
J. H. CROWLEY.
LOOM TEMPLE.
No. 276,959. Patented May 1, 1883.
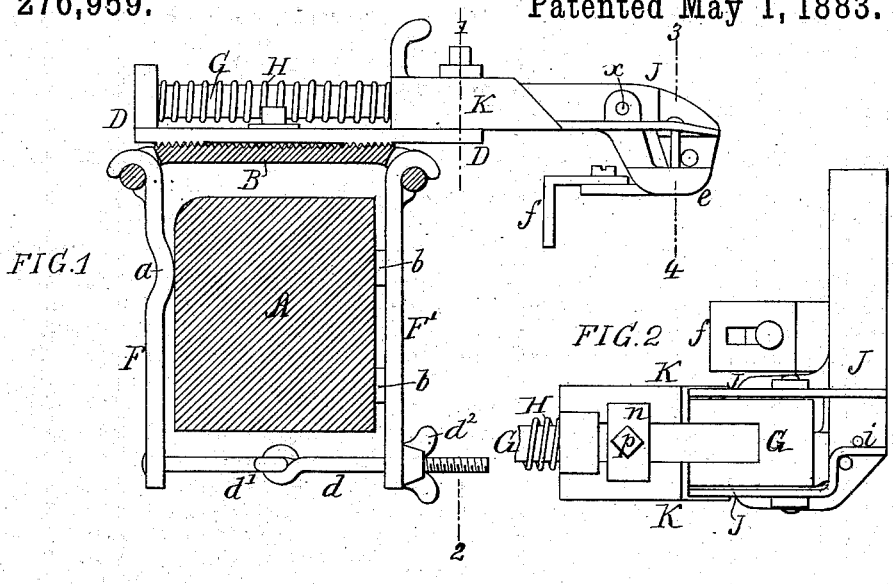
FIG.1
FIG.2
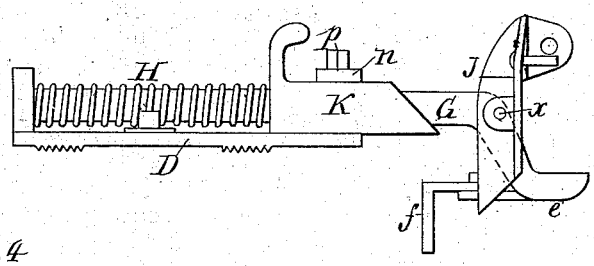
FIG.3
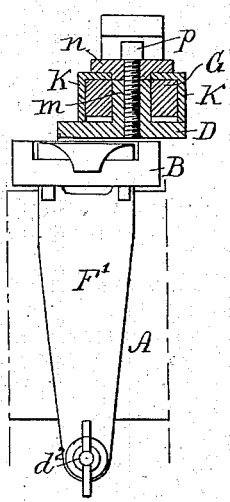
FIG.4
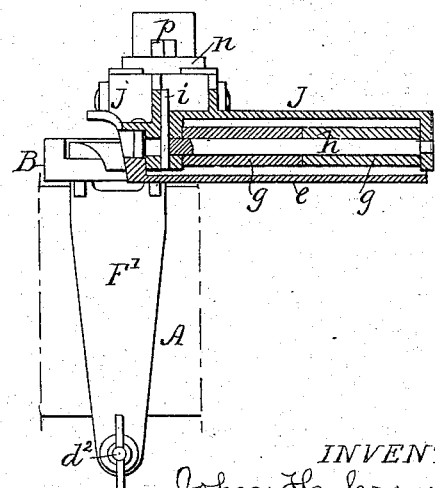
FIG.5
WITNESSES:
Harry Drury
Harry Smith
INVENTOR.
John H. Crowley
by his attys
Howson & Son

UNITED STATES PATENT OFFICE.

JOHN H. CROWLEY, OF PHILADELPHIA, PENNSYLVANIA.

LOOM-TEMPLE.

SPECIFICATION forming part of Letters Patent No. 276,959, dated May 1, 1883.

Application filed November 13, 1882. (No model.)

*To all whom it may concern:*

Be it known that I, JOHN H. CROWLEY, a citizen of the United States, and a resident of Philadelphia, Pennsylvania, have invented an Improvement in Loom-Temples, of which the following is a specification.

The main objects of my invention are to provide means for firmly clamping the temple to the breast-beam of the loom, and to so construct the temple that the roller-carrier can be readily raised for the insertion or removal of the cloth, or to permit access to the roller or rollers, other features of the invention relating to minor details of construction, as fully explained hereinafter, and pointed out in the claims.

In the accompanying drawings, Figure 1 is a side view, partly in section, of my improved loom-temple and the clamp for securing the same to the breast-beam of a loom; Fig. 2, a plan view of part of the temple; Fig. 3, a side view of the temple, with the roller-carrier elevated; Fig. 4, a transverse section on the line 1 2, Fig. 1; and Fig. 5, a transverse section on the line 3 4, Fig. 1.

A is the breast-beam of a loom, and B the plate to which the temple-frame D is secured, said frame D being bolted to the plate, and the latter having its upper surface serrated for the reception of serrated projections on the temple-frame, so that the slipping of said frame on the plate is prevented.

To slots near the opposite ends of the plate B are adapted the upper hooked ends of plates F F', the former having a lug, $a$, bearing upon the outside of the breast-beam, and the plate F' having projections $b\ b$ bearing against the inner side of the beam. The lower ends of the plates F F' project below the beam, and are connected by a screw-rod, $d$, hung to an eye, $d'$, on the plate F, and furnished with a nut, $d^2$, bearing against the plate F', so that on tightening the nut the plates are caused to bind firmly on the breast-beam, and the plate B is rigidly secured thereto, the loosening of the plate, however, being readily effected by slacking up the nut $d^2$. This mode of securing the temple to the beam permits the inclination of the temple to any extent desired, the plate F being raised or lowered in respect to the plate F', so as to impart the proper angle to the plate B before tightening the nut $d^2$.

Owing to the projection $a$ on the plate F, said plate acts as a lever and permits the application of the temple to beams of different sizes.

In the temple-frame D is guided the usual bar, G, of the roller-carrier, the inner end of said bar carrying the usual roller shield or trough, $e$, and the latter having secured to it the lug $f$, against which the lathe of the loom strikes in beating up, so as to impart the desired forward movement to the roller-carrier, a spring, H, causing the return of the roller-carrier on the backward movement of the lathe.

The roller-carrier J is forked for the reception of the bar G, and is pivoted to the said bar at $x$, the rear ends of the carrier being inclined for engagement with the inclined front ends of the forked bolt K, which is guided on the bar G, and is acted upon by the spring H, the tendency of which is to press the bolt against the rear ends of the carrier, and thus lock the same in the position shown in Fig. 1. By drawing back the bolt, however, until the carrier is free from the control of the same, said carrier can be turned on its pivot, as shown in Fig. 3, so as to expose the rollers $g$ or permit the insertion or removal of the fabric. There are in the present instance two rollers $g\ g$ in the carrier, these rollers turning on a spindle, $h$, one end of which is reduced in diameter for adaptation to an opening in one end of the carrier, the opposite end of the spindle being adapted to a larger opening in the opposite end of the carrier, and being retained therein by a vertical pin, $i$, which bears upon the end of the spindle, the latter thus being held in place without the formation of any screw-threads.

The bar G of the temple is slotted, so as to embrace the central stud, $m$, of the plate D, a transverse plate, $n$, held in position by a bolt, $p$, serving to retain the bar in position vertically, and said plate being recessed on the under side for the reception of flanges on the locking-bolt K.

Instead of making the temple-frame D adjustable on the plate B, said frame may form part of the plate, if desired.

Instead of forking the roller-carrier and locking-bolt, the carrier may have a single projection adapted to engage with a single bolt; but the construction shown is preferred.

I claim as my invention—

1. The combination of the temple-plate B, the plate F, hinged thereto and having a projection, a, adapted to bear upon one side of the breast-beam, the plate F', hinged to the plate B, and adapted to bear on the opposite side of the beam, and mechanism for drawing the lower ends of said plates together, as set forth.

2. The combination of the temple-plate B, the plates F F', hinged thereto and adapted to bear upon the opposite sides of the breast-beam of a loom, the pivoted screw-rod $d$, and the nut $d^2$, as set forth.

3. The combination of the temple-frame bar and spring with the roller-carrier pivoted to said bar, and the sliding bolt K, adapted to bear upon the end of the roller-carrier to retain the same in position, as set forth.

4. The combination of the temple-frame bar and spring with the roller-carrier pivoted to said bar, and having its end or ends inclined, and the sliding bolt K, having an end or ends inclined for engagement with those of the carrier, as set forth.

5. The combination of the temple-frame with the bar G, the roller-carrier pivoted thereto, the sliding bolt K, and a spring, H, adapted to act upon both the bar and the bolt, as set forth.

6. The combination of the roller-carrier with the roller or rollers, the spindle $h$, reduced in diameter at the outer end, and the retaining-pin $i$, as set forth.

In testimony whereof I have signed my name to this specification in the presence of two subscribing witnesses.

JOHN H. CROWLEY.

Witnesses:
HARRY DRURY,
HARRY SMITH.